Figure 1:
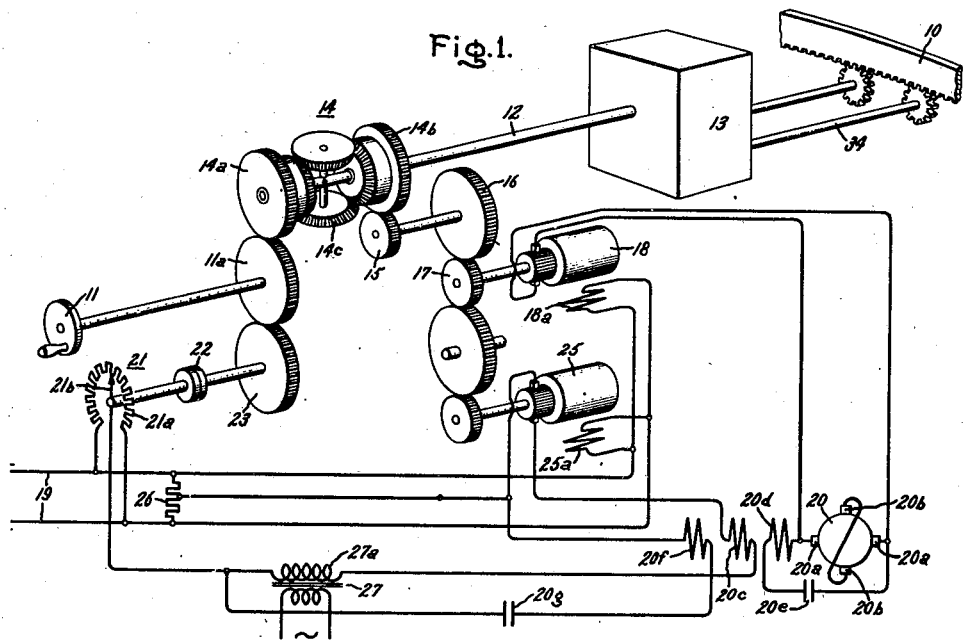

June 14, 1949.　　E. F. W. ALEXANDERSON ET AL　　2,473,235
FOLLOW-UP CONTROL SYSTEM
Filed April 15, 1944

Inventors:
Ernst F. W. Alexanderson,
Martin A. Edwards,
Gerald A. Hoyt,
by Harry E. Dunham
Their Attorney.

Patented June 14, 1949

2,473,235

UNITED STATES PATENT OFFICE 2,473,235

FOLLOW-UP CONTROL SYSTEM

Ernst F. W. Alexanderson, Schenectady, Martin A. Edwards, Scotia, and Gerald A. Hoyt, Schenectady, N. Y., assignors to General Electric Company, a corporation of New York Application April 15, 1944, Serial No. 531,184

4 Claims. (Cl. 318—2)

This invention relates to control systems, more particularly to aided tracking control systems, and it has for an object the provision of a simple, reliable, and improved aided tracking control system of this character.

An aided tracking control system combines displacement tracking and rate tracking. In displacement tracking, the displacement of the driven member is proportional to the displacement of a control device from its initial position. In rate tracking, displacement of the control device controls only the rate of movement of the driven member, and the rate of such movement is proportional to the displacement of the control device from its initial position. Thus in aided tracking, which combines both the foregoing types of tracking, each displacement of the control device produces a corresponding displacement of the driven member plus a corresponding increase in the rate of movement which continues after the displacement of the control device has been completed.

Heretofore, certain disadvantages were inherent in aided tracking control systems. One disadvantage was that in following a target with low angular velocity, if the operator had established the correct rate and found it necessary to make a correction of position, a displacement of the control device to make the required positional correction also upset the rate control.

This disadvantage is eliminated by the provision of means for continuously varying the ratio between the position control and the rate control and so adjusting the ratio that at all times, it is best adapted to the operating conditions existing at any particular time. In carrying the invention into effect in one form thereof, the control device, which may be a handwheel, is connected through a mechanical differential to the driven member which may be a gun or a radio detecting and ranging device. A displacement of the control device produces a corresponding displacement of the driven member. The "rate" movement is produced by an electric motor which is connected to the driven member through the differential device. This motor is referred to as the rate motor. It is controlled by suitable means for changing the ratio between a predetermined amount of displacement in the control device and the resultant change in speed of the rate motor in accordance with the magnitude of the total displacement of the control device from an initial position. In one form, this means comprises a potentiometer which is actuated by the control device and which has a tapered resistance element to provide a control voltage which varies as some exponential function of the displacement of the control device. This voltage is utilized to control the supply of voltage to the rate motor to effect operation of the rate motor at a corresponding speed.

Figure 2:
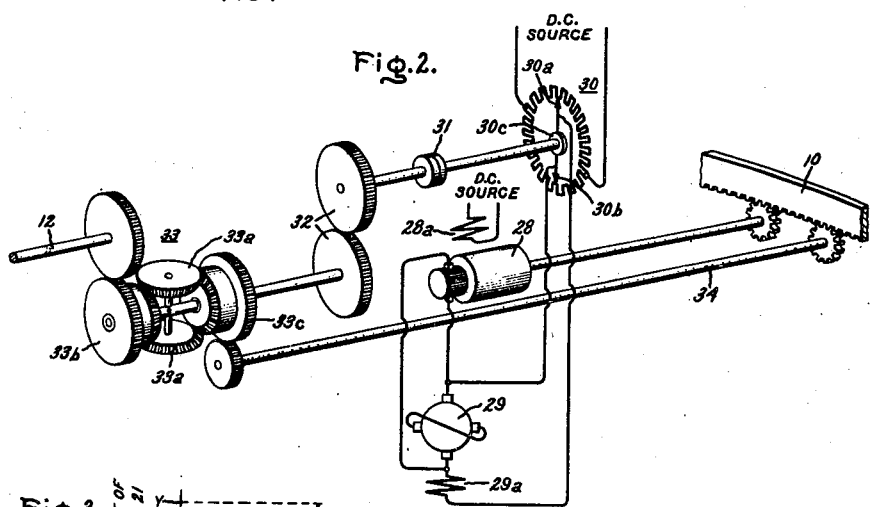
Figure 3:
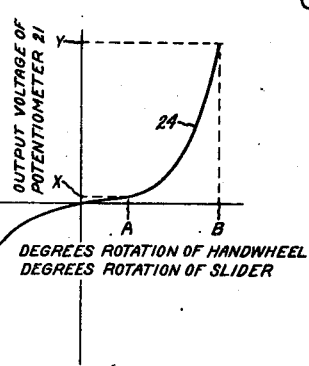

For a better and more complete understanding of the invention, reference should now be had to the following specification and to the accompanying drawings, of which Fig. 1 is a simple, diagrammatical illustration of an embodiment of the invention; Fig. 2 is a simple, diagrammatical sketch of a preferred form of a torque amplifier which constitutes a portion of the complete system; and Fig. 3 is a chart of a characteristic curve which serves to facilitate an understanding of the invention.

Referring now to the drawing, the movement in train of an object 10 is to be controlled by a control device such as the handwheel 11. The object 10 may be any object such as an anti-aircraft gun, or a radio detecting and ranging device. The driven object 10 may be direct connected to a driving member such as the shaft 12 or, if required by its mass or remote location, it may be connected to the shaft 12 through a suitable torque amplifier 13. This torque amplifier may be of any suitable type such as the torque amplifier illustrated in Fig. 2, or it may be any other suitable torque amplifier. The handwheel 11 is connected through a mechanical differential device 14 to the output shaft 12. This differential device comprises two input gears 14a and 14b and an output member 14c which is coupled to the output shaft 12.

As shown, the input gear 14a meshes with a gear 11a on the shaft of the handwheel 11, and the input gear 14b is connected through gears 15, 16, and 17, having a suitable reduction ratio, to the drive shaft of an electric motor 18. The motor is provided with a field winding 18a which is supplied from a suitable source of excitation such as the D.-C. buses 19.

The armature of the motor 18 is supplied from any suitable means such, for example, as the D.-C. armature reaction excited dynamoelectric machine 20. This machine has two pairs of brushes 20a and 20b arranged on quadrature axes of the machine. The pair of brushes 20a is connected to the load, which in this case is the armature of motor 18. Consequently, the axis on which this pair of brushes is arranged is referred to as the load axis. The brushes 20b are short circuited and the quadrature axis on which they are arranged is referred to as the short circuit axis. As shown, the dynamoelectric machine 20 is provided with a control field winding 20c and with a stabilizing field winding 20d which is connected in series with a capacitor 20e across the load brushes of the machine. Both field windings 20c and 20d are arranged on the load axis of the machine. Important characteristics of the dynamoelectric machine 20 are its high speed of response, and its high amplification factor, i. e., the ratio between the power supplied to the control field winding 20c and the power delivered from the load brushes to the load.

For the purpose of controlling the speed of the motor 18 in response to displacement of the handwheel 11, a variable potentiometer 21 is provided. The resistance element 21a of this potentiometer is connected across a suitable source of substantially constant D.-C. voltage such as the source 19, and the slider 21b is mechanically connected through a slip clutch 22 and gearing 23 to the handwheel 11.

The winding of the resistance element of the potentiometer 21 is tapered so that the voltage derived between the slider and the midpoint of the resistance element in either direction has an exponential relationship to the displacement of the slider in degrees from such midpoint. This relationship is illustrated in Fig. 3 by the curve 24 of which the ordinates represent the voltage derived between the slider and the midpoint of the potentiometer, and the abscissae represent the degree rotation of the slider from the midpoint. Since rotation of the slider is produced by rotation of the handwheel, the abscissae also represent the displacement of the handwheel 11 from an initial position which corresponds to the midpoint of the resistance element of the potentiometer.

As indicated by this curve, the resistance element is tapered so that the derived voltage varies as the square of the degrees of rotation of the slider. It may be desirable that the derived voltage shall vary as the cube of the displacement or as some other exponential function thereof, and in such case the resistance element is wound to give the desired exponential relationship.

The control field winding 20c of the dynamoelectric machine 20 is excited by the difference of the voltage derived from the potentiometer and a control voltage which is proportional to the speed of the motor 18. To this end, the control field winding is connected in a circuit which includes the potentiometer 21, a tachometer generator 25 which is driven by the motor 18, and a fixed potentiometer 26 which is connected in parallel with the potentiometer resistance 21a across the source 19. As shown, one terminal of the control field winding 20c is connected through the secondary winding 27a of a transformer 27 to the slider 21b of the potentiometer. The opposite terminal of the control field winding is connected to one brush of the tachometer generator 25 of which the other brush is connected to the center tap of the fixed potentiometer 26. The tachometer generator is so poled that its voltage opposes the voltage derived from the potentiometer 21.

The primary winding of the transformer 27 is supplied from a suitable A.-C. source. The purpose of the transformer is to supply an alternating voltage of low magnitude to the control field winding 20c of the dynamoelectric machine 20 for the purpose of overcoming the hysteresis of the machine.

With the foregoing understanding of the elements and their organization, the operation of the system will readily be understood from the following description:

A small displacement of the handwheel 11 from its zero position is transmitted through the mechanical differential gear 14, output shaft 12, and torque amplifier 13, if used, to the driven member 10. In addition, the displacement of the handwheel 11 is transmitted through gearing 23 to the taper wound potentiometer 21 so that the slider 21b is displaced from the zero voltage center tap a corresponding amount in a direction corresponding to the direction of the displacement of the handwheel from its zero position. As a result of the displacement of the slider 21b, a voltage of a polarity corresponding to the direction of the displacement is applied to the control field winding 20c. Since the displacement of the slider 21b was assumed to be a small one, the voltage derived from the potentiometer is correspondingly small as indicated by the abscissa $a$ representing the displacement and the ordinate $x$ representing the derived voltage.

The armature reaction excited dynamoelectric machine responds very rapidly to the excitation of its control field winding and supplies a voltage to the driving motor 18 of a polarity which corresponds to the direction of the displacement of the handwheel. When voltage is first supplied to the motor 18, the voltage of the tachometer generator is zero, since the generator is at rest. Consequently, the excitation of the control field winding 20c is considerably greater than is required for operation of the motor at low speed and as a result, the acceleration of the motor is forced. The motor 18 drives the input member 14b of the differential gear and since the input member 14a is now stationary, the output shaft 12 and driven object 10 are driven at a corresponding speed of which the magnitude depends upon the ratio of the gearing 15, 16, and 17 and the differential gear 14.

The motor 18 also drives the tachometer generator 25 which generates a speed voltage which is proportional to the speed of the motor. This speed voltage is supplied to the control field winding circuit in opposition to the voltage derived from the potentiometer. As the motor 18 accelerates, the voltage of the tachometer generator increases, thereby decreasing the excitation of the control field winding and also correspondingly decreasing the acceleration. The speed of the motor continues to rise, however, until a balanced condition is reached between the voltage derived from the potentiometer and the voltage of the tachometer generator such that any further increase in the speed of the motor would decrease the excitation of the control field winding to such an extent that the speed of the motor would begin to decrease.

The motor 18 drives the driven object continuously at this low speed as long as the handwheel remains in the position to which it was last moved.

If the handwheel 11 is now given a further and larger displacement, e. g., such as to effect a displacement of the potentiometer slider 21b from position A in Fig. 3 to position B, the driven object 10 will be given an immediate positional displacement which is proportional in amount, from its position at the beginning of such displacement.

Owing to the exponential characteristic of the potentiometer 21, the speed of the motor 18 is now increased from the value represented by ordinate $x$ to the new and much higher value represented by the ordinate $y$, and the motor will drive the driven object continuously at this increased speed until the handwheel 11 is again displaced to a new position. From the foregoing, it will be noted that a displacement of the handwheel 11 produces a corresponding displacement of the driven object, and also effects a non-linear increase in the rate at which the driven object is driven by the motor. In other words, increasing displacement of the control handwheel produces a continuously variable ratio between the position control and the rate control.

In tracking a moving target, the handwheel is first given a very small displacement from zero, thereby giving the detector, i. e., the driven object 10 a small displacement and causing the rate motor 18 to drive the detector at a very low rate for scanning the horizon. If a moving target is picked up in the detector, during the course of the scanning, the handwheel is moved so as to keep the detector on the target. If the target tends to lead the detector, the displacement of the handwheel is increased, thereby effecting a corresponding displacement or positional correction of the detector and a very minute increase in the rate at which the detector is driven. If the angular velocity of the detector is less than that of the target with respect to the detector location, the target will again tend to lead the detector and the handwheel is again displaced to effect a positional correction and an increase in rate. Once the correct rate is established, the detector will remain on the target as long as its angular velocity with respect to the detector location remains constant. However, as the range lessens, i. e., as the distance between the target and the detector decreases, the angular velocity of the target increases more rapidly than it did at maximum range.

In order to maintain the detector on the target as the target approaches the detector, the operator must make further displacements of the handwheel. With each new displacement of the handwheel the speed of the rate motor is increased in accordance with the characteristic curve 24. When the target is very close to the director, its angular velocity is very high and is increasing very rapidly. Since the director has been maintained on the target by repeated displacements of the handwheel, its rate is correspondingly high. Consequently a displacement of the handwheel at this high velocity of the target produces a very much larger increase in the rate of movement of the detector than the same displacement would have produced at low velocity as indicated by the characteristic curve 24. As a result, the ease and accuracy with which the operator can maintain the director on the target at high angular velocities of the target are greatly increased.

A condition which frequently occurs in tracking a target is that the tracking unit is either lagging or leading the target by some amount but is moving at the correct rate. Consequently, the tracking unit continues to lag or lead the target by such amount until a correction in the position of the tracking unit is made. For the purpose of enabling the operator to get on the target quickly, the dynamoelectric machine 20 is provided with an additional field winding 20f which is connected between the slider 21b of the tapered potentiometer 21 and the center tap of resistor 26. A capacitor 20g is connected in series relationship with the field winding 20f.

If the voltage between the slider 21b and the center tap of resistor 26 is changed, the charge on the capacitor is also changed and the charging current flows through the field winding 20f. This charging current is proportional to the rate of change of voltage and is thus proportional to the rate of change of position or velocity of the slider 21b and also to the velocity of the handwheel 11.

Thus, by moving the handwheel 11 rapidly, the operator causes a large current to flow in the field winding 20f and produces correspondingly large changes in the speeds of the rate motor 18 and the tracking unit 10. Similarly, by moving handwheel 11 slowly, a very small change is produced in the speed of the tracking unit. The new speed of the tracking unit produced by the larger current in the field winding 20f lasts only as long as the handwheel is in motion.

If the operator observes that the tracking unit is lagging the target, although moving at the correct rate, he imparts a rapid movement to the handwheel 11 in a direction corresponding to the direction of the target. This causes a rapid increase in speed which enables the tracking unit to overtake the target. If the handwheel were allowed to remain in the new position to which it was moved, the speed of the tracking unit would become stabilized at a new high value as a result of the increased excitation of the control field winding 20c. Since the rate was initially correct when the error was observed, the new high rate would cause the tracking unit to pass and lead the target. In order to prevent this, the operator must return the handwheel to the position which it occupied before the correction was initiated. If the handwheel is returned at the same rapid rate at which it was advanced, a reverse charging current of the same magnitude would flow in the field winding 20f and the speed of the tracking unit would be decreased below the correct rate and the tracking unit would again lag the target. Therefore, the handwheel must be returned slowly so that the tendency of the reverse charging current to decrease the speed of the tracking unit will be offset by the tendency of the increased excitation on the control field winding 20c to increase its speed.

If the tracking unit is leading the target, although moving at the correct speed, the handwheel 11 is given a sudden motion in the direction opposite to the motion of the target and is returned slowly to the position it occupied when the correction was initiated.

The torque amplifier 13 which is illustrated in detail in Fig. 2 comprises an electric motor 28 which drives the detector unit, i. e., the driven object 10 of Fig. 1. Its field winding 28a is excited from a suitable D.-C. source and its armature is supplied from an armature reaction excited dynamoelectric machine 29 which is driven by suitable means (not shown). The dynamoelectric machine 29 is provided with a control field winding 29a which is excited from a commutator type potentiometer 30. The potentiometer 30 is excited from a suitable D.-C. source which may be and preferably is the same source as that from which the motor field 28a is excited.

The potentiometer brushes 30a and 30b are carried on a brush yoke 30c which is connected through a slip clutch 31 and gearing 32 to the output member 33a of a differential device 33 of which one input gear 33b is connected to or mounted on the output shaft 12 of Fig. 1, and the other input gear 33c is connected through a follow-up shaft 34 to the driven object 10.

The operation is as follows: Rotation of the output shaft 12 as a result of displacement of the handwheel 11 and subsequent rotation of the motor 18 is transmitted through the differential gear 33 to the brush yoke 30c. As a result of the displacement of the brushes on the commutator, a voltage is supplied to the control field winding 29a. The armature reaction excited dynamoelectric machine 29 then generates a voltage which is controlled in polarity and magnitude by the polarity and magnitude of the excitation of the control field winding 29a. This voltage is supplied to the armature of the driving motor 28 which rotates the driven object 10, and the rotation of the driven object is transmitted back through the follow-up shaft 34 to the input gear 33c of the differential device in such a manner that the brush yoke 30c of the commutator potentiometer is turned back to its original position. The driven object is then moved through a definite angle which bears a fixed ratio to the original displacement of the rotation of the output shaft 12. If the output shaft 12 is driven continuously by the rate motor 18, the driven object will follow at a corresponding rate.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States is:

1. An aided tracking control system comprising in combination, an input control device, a driven member, an electric motor for driving said member, means responsive to a displacement of said control device from an initial position to a second position for effecting a corresponding displacement of said driven member and for controlling the supply of voltage to said motor to cause said motor to drive said member continuously at a speed having a predetermined relationship to said displacement while said control device remains in said second position, and means responsive to the rate of change of said displacement for temporarily varying the speed of said motor to effect a corresponding additional displacement of said driven member.

2. An aided tracking control system comprising in combination an input control device, a driven member, an electric motor, a mechanical differential device having an output member connected to said driven member, an input member connected to said motor and a second input member connected to said control device to produce a displacement of said driven member corresponding in magnitude to a displacement of said control device from an initial position, a potentiometer actuated by said control device for producing a control voltage having a predetermined relationship to said displacement of said control device, means for controlling the supply of voltage to said motor to cause said motor to drive said member continuously at a speed corresponding to said displacement comprising an armature reaction excited dynamoelectric machine provided with a control field winding connected to said potentiometer and excited in accordance with said control voltage, and means for regulating the speed of said motor to a value corresponding to said control voltage comprising a tachometer generator driven by said motor for generating a voltage proportional to the speed of said motor and connected in circuit with said control field winding so that said generated voltage opposes said control voltage.

3. An aided tracking control system comprising in combination, an input control device, a driven member, an electric motor for driving said member, supply means for said motor comprising an armature reaction excited dynamoelectric machine provided with a main control field winding and an auxiliary control field winding, means responsive to displacement of said control device from an initial position to a second position for supplying a voltage to said main control field winding to control said dynamoelectric machine to cause said motor to drive said member continuously at a speed having a predetermined relationship to said displacement while said control device remains in said second position, a source of D.-C. voltage connected to said auxiliary field winding, means responsive to said displacement for varying said D.-C. voltage, and a capacitor connected in series relationship with said auxiliary field winding to effect a temporary variation of the excitation of said dynamoelectric machine in response to the rate of change of said displacement thereby to effect a corresponding additional displacement of said driven member.

4. An aided tracking control system comprising in combination, an input control device, a driven member, an electric motor, a mechanical differential device having an output member connected to said driven member, an input member connected to said motor and a second input member connected to said control device to produce a displacement of said driven member corresponding in magnitude to a displacement of said control device from an initial position, a potentiometer actuated by said control device for producing a control voltage having a predetermined relationship to said displacement of said control device, means for controlling the supply of voltage to said motor to cause said motor to drive said member continuously at a speed corresponding to said displacement comprising an armature reaction excited dynamoelectric machine provided with a control field winding connected to said potentiometer and excited in accordance with said control voltage, means for regulating the speed of said motor to a value corresponding to said control voltage comprising a tachometer generator driven by said motor for generating a voltage proportional to the speed of said motor and connected in circuit with said control field winding so that said generated voltage opposes said control voltage, and means responsive to the rate of change of displacement of said control device for effecting a temporary variation in the speed of said motor comprising a second control field winding on said dynamoelectric machine connected to said potentiometer independently of said tachometer generator and a capacitor connected in series relationship with said field winding.

ERNST F. W. ALEXANDERSON.
MARTIN A. EDWARDS.
GERALD A. HOYT.

REFERENCES CITED

The following references are of record in the file of this patent:

UNITED STATES PATENTS

| Number | Name | Date |
|---|---|---|
| 714,763 | Day | Dec. 2, 1902 |
| 1,703,317 | Minorsky | Feb. 26, 1929 |
| 1,800,328 | Sundhaussen | Apr. 14, 1931 |
| 2,071,424 | Papello | Feb. 23, 1937 |
| 2,344,352 | Graham | Mar. 14, 1944 |
| 2,425,433 | Linderoth | Aug. 12, 1947 |

FOREIGN PATENTS

| Number | Country | Date |
|---|---|---|
| 350,955 | Great Britain | June 11, 1931 |
| 371,517 | Great Britain | Apr. 28, 1932 |
| 683,021 | France | June 5, 1930 |